(12) United States Patent
Kohonen et al.

(10) Patent No.: US 10,074,966 B2
(45) Date of Patent: Sep. 11, 2018

(54) CABLE CLAMP

(71) Applicant: XIEON NETWORKS S.À.R.L., Senningerberg (LU)

(72) Inventors: Petri Kohonen, Vantaa (FI); Pasi Räikkönen, Röykkä (FI)

(73) Assignee: XIEON NETWORKS S.A.R.L., Senningerberg (LU)

(*) Notice: Subject to any disclaimer, the term of this patent is extended or adjusted under 35 U.S.C. 154(b) by 0 days.

(21) Appl. No.: 15/127,049

(22) PCT Filed: Mar. 12, 2015

(86) PCT No.: PCT/EP2015/055148
§ 371 (c)(1),
(2) Date: Sep. 19, 2016

(87) PCT Pub. No.: WO2015/140031
PCT Pub. Date: Sep. 24, 2015

(65) Prior Publication Data
US 2017/0117693 A1    Apr. 27, 2017

(30) Foreign Application Priority Data
Mar. 19, 2014  (FI) ..................................... 20145255

(51) Int. Cl.
*H02G 3/08* (2006.01)
*H02G 15/007* (2006.01)
*H02G 3/22* (2006.01)

(52) U.S. Cl.
CPC ............... *H02G 3/083* (2013.01); *H02G 3/22* (2013.01); *H02G 15/007* (2013.01)

(58) Field of Classification Search
CPC .............................. H02G 3/22; H02G 15/007
See application file for complete search history.

(56) References Cited

U.S. PATENT DOCUMENTS 2,277,637 A    3/1942 Eby
2,945,085 A *  7/1960 Billups .................... F16L 5/00
                                                174/153 G
(Continued)

FOREIGN PATENT DOCUMENTS

DE    202010000903    6/2011
GB        2256322    12/1992
WO      2006092690     9/2006

OTHER PUBLICATIONS

International Search Report and Written Opinion of the International Searching Authority PCT/EP2015/055148 dated Jun. 2, 2015.
(Continued)

*Primary Examiner* — William H Mayo, III
*Assistant Examiner* — Hiram E Gonzalez
(74) *Attorney, Agent, or Firm* — Young & Thompson

(57) ABSTRACT

A cable clamp for clamping a cable with respect to a through hole of a solid object is presented. The cable clamp includes first and second elements (102, 103) and retainer devices (105) for keeping the first and second elements with respect to each other so that the cable gets clamped between the first and second elements and the cable clamp gets locked to the edges of the through hole with the aid of first claws extending over the edges of the through hole on a first side of the solid object and with the aid of second claws capable of extending over the edges of the through hole on the second side of the solid object. The cable clamp can be inserted into the through hole when the first and second elements are tilted with respect to each other so that the first claws are nearer to each other.

15 Claims, 7 Drawing Sheets

(56) References Cited

U.S. PATENT DOCUMENTS

| | | | | |
|---|---|---|---|---|
| 3,689,014 A | * | 9/1972 | Fink | H02G 3/065 |
| | | | | 174/153 G |
| 3,788,582 A | * | 1/1974 | Swanquist | H02G 3/0658 |
| | | | | 174/153 G |
| 3,809,798 A | * | 5/1974 | Simon | H02G 3/0633 |
| | | | | 174/135 |
| 4,277,641 A | | 7/1981 | Bauer et al. | |
| 4,299,363 A | | 11/1981 | Datschefski | |
| 4,517,408 A | * | 5/1985 | Pegram | H02G 3/0641 |
| | | | | 174/153 G |
| 4,640,479 A | * | 2/1987 | Shely | H02G 3/0641 |
| | | | | 16/2.2 |
| 4,646,995 A | * | 3/1987 | Matsui | H02G 3/0641 |
| | | | | 174/153 G |
| 4,729,534 A | | 3/1988 | Hill et al. | |
| 6,469,953 B1 | * | 10/2002 | Hong | G11C 8/06 |
| | | | | 326/121 |
| 6,627,817 B1 | * | 9/2003 | Kortenbach | H02G 3/083 |
| | | | | 174/541 |
| 8,742,680 B2 | * | 6/2014 | Cowburn | H05B 37/0254 |
| | | | | 315/132 |
| 2003/0122040 A1 | | 7/2003 | Pisczak | |
| 2014/0041932 A1 | | 2/2014 | Nice | |

OTHER PUBLICATIONS

Finnish Search Report dated Oct. 30, 2014; Application No. 20145255.

* cited by examiner

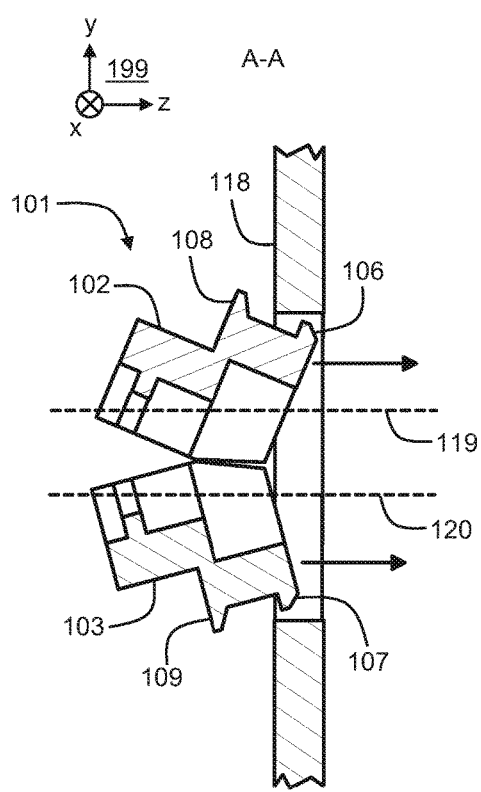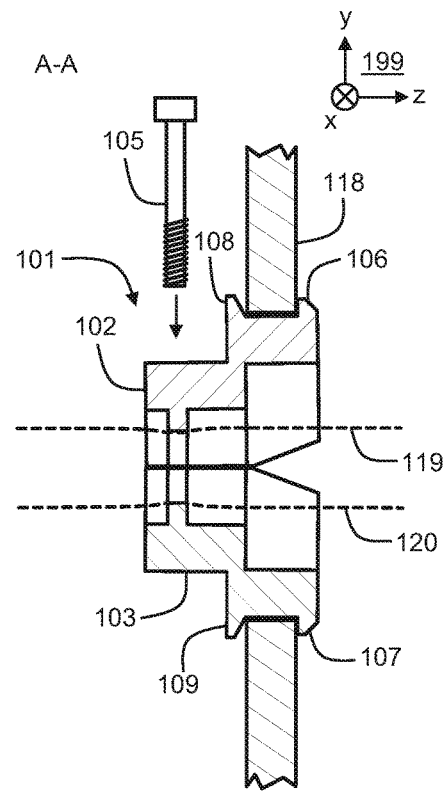
Figure 1d                    Figure 1e

CABLE CLAMP

FIELD OF THE INVENTION

The invention relates to a cable clamp suitable for clamping a cable with respect to a through hole of a casing of an electrical device or with respect to a through hole of another solid object.

BACKGROUND

In conjunction with many electrical devices, a cable has to be clamped with respect to a casing or another mechanical structure of the electrical device in order to provide a strain relief for protecting electrical components connected to the cable against damaging when strain is directed to the cable. The clamping can be accomplished with a cable clamp which comprises means for pressing against the sheath of the cable and means for attaching to the casing or another mechanical structure of the electrical device. Publication US2003122040 presents a cable clamp that comprises a first element, a second element, and retainer devices for keeping the first and second elements together so that a cable gets clamped between the first and second elements. The cable clamp further comprises a cantilever provided with a though hole so that the cable clamp can be attached to a casing or another mechanical structure of an electrical device with e.g. a screw.

In many cases, a casing of an electrical device is provided with a through hole for arranging a lead-in for a cable and there is a need to clamp the cable with respect to the edges of the through hole in order to provide a strain relief for protecting electrical components connected to the cable against damaging when strain is directed to the cable. A cable clamp of the kind described in the above-mentioned publication US2003122040 is unsuitable for situations where the cable clamp needs to be locked to the edges of the through hole and simultaneously to clamp the cable. Especially challenging are cases where the diameter of a cable to be clamped is significantly smaller than the diameter of the through hole. Therefore, there is a need for such cable clamps that are suitable for situations of the kind mentioned above.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new cable clamp for clamping a cable with respect to a through hole of a solid object. The solid object can be, for example but not necessarily, a wall of a casing of an electrical device.

A cable clamp according to the invention comprises a first element, a second element, and one or more retainer devices for keeping the first and second elements with respect to each other so that the first and second elements are in a first mutual position, wherein:

a) in response to being in the first mutual position, the first and second elements are capable of i) clamping the cable between the first and second elements and ii) being locked to the edges of the through hole with the aid of first claws capable of extending over the edges of the through hole on a first side of the solid object and with the aid of second claws capable of extending over the edges of the through hole on the second side of the solid object, and b) in response to being in a second mutual position, where the first and second elements are tilted with respect to each other so that the first claws are nearer to each other than in the first mutual position, the first and second elements are capable being inserted to the through hole.

A direction, in which the first claws are nearer to each other in the second mutual position than in the first mutual position, is substantially non-intersecting with directions in which the first claws are capable of extending over the edges of the through hole on the first side of the solid object when the first and second elements are in the first mutual position. The first element includes a clamping part that is a separate piece of material with respect to a body of the first element, and when the one or more retainer devices press the clamping part towards the second element, the clamping part presses the cable against the second element.

The above-described cable clamp can be installed into the through hole when the first and second elements are tilted with respect to each other, and thereafter the one or more retainer devices can be used to force the first and second elements to the first mutual position where the cable gets clamped between the first and second elements and also the cable clamp itself gets locked to the edges of the through hole.

In accordance with the invention, there is provided also a new electrical device that can be, for example but not necessarily, a part of telecommunication equipment and it may comprise, for example, a processing system for supporting at least one of the following data transfer protocols: Internet Protocol "IP", Ethernet protocol, MultiProtocol Label Switching "MPLS" protocol, and/or Asynchronous Transfer Mode "ATM". An electrical device according to the invention comprises:

a cable, a casing having a through hole for the cable, one or more electrical components inside the casing and connected to the cable, and a cable clamp according to the invention for clamping the cable with respect to the edges of the through hole of the casing.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which:

FIGS. 1a, 1b, 1c, 1d, and 1e illustrate a cable clamp according to an exemplifying and non-limiting embodiment of the invention.

DESCRIPTION OF EXEMPLIFYING AND NON-LIMITING EMBODIMENTS

Figure 1A:
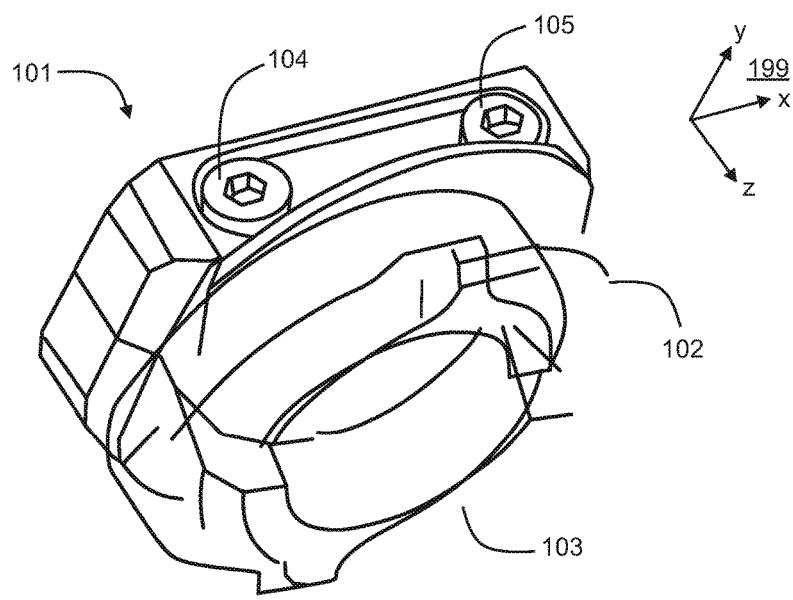
Figures 1B, 1C:
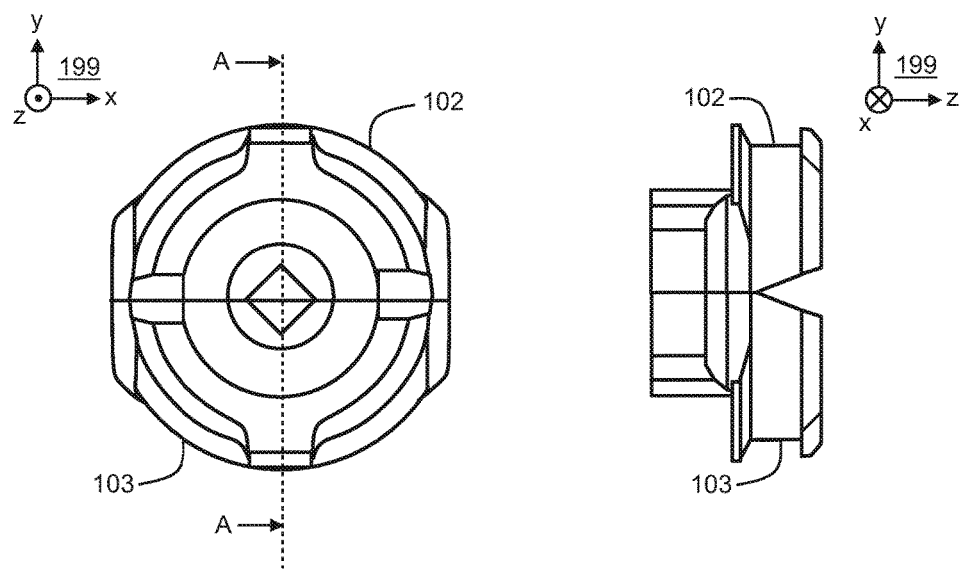

FIG. 1a shows a perspective view of a cable clamp 101 according to an exemplifying and non-limiting embodiment of the invention. FIG. 1b shows a front view of the cable clamp, and FIG. 1c shows a side view of the cable clamp. FIGS. 1d and 1e show section views that illustrate installation of the cable clamp 101 into a through hole of a wall 118. The section is taken along a line A-A shown in FIG. 1b and the section plane is parallel with the yz-plane of a coordinate system 199. The cable clamp comprises a first element 102, a second element 103, and retainer devices 104 and 105 for keeping the first and second elements with respect to each other so that the first and second elements are in a first mutual position. In the exemplifying case illustrated in FIGS. 1a-1e, the retainer devices 104 and 105 7are screws. A situation where the first and the second elements 102 and 103 are in the above-mentioned first mutual position with respect to each other is illustrated in FIGS. 1a-1c, and 1e. As illustrated in FIG. 1e, the first and second elements 102 and 103 are capable of being locked to the edges of the through hole of the wall 118 with the aid of first claws 106 and 107 extending over the edges of the through hole on a first side of the wall and with the aid of second claws 108 and 109 extending over the edges of the through hole on the second side of the wall. As illustrated in FIG. 1d, the first and second elements 102 and 103 can be inserted into the through hole of the wall 118 when the first and second elements 102 and 103 are in a second mutual position where the first and second elements are tilted with respect to each other so that the first claws 106 and 107 are nearer to each other than in the first mutual position shown in FIG. 1e. As illustrated in FIG. 1e, the first and second elements 102 and 103 are capable of clamping a cable when being in the first mutual position. In FIGS. 1d and 1e, the outer surface of the cable is depicted with dashed lines 119 and 120.

Figure 2:
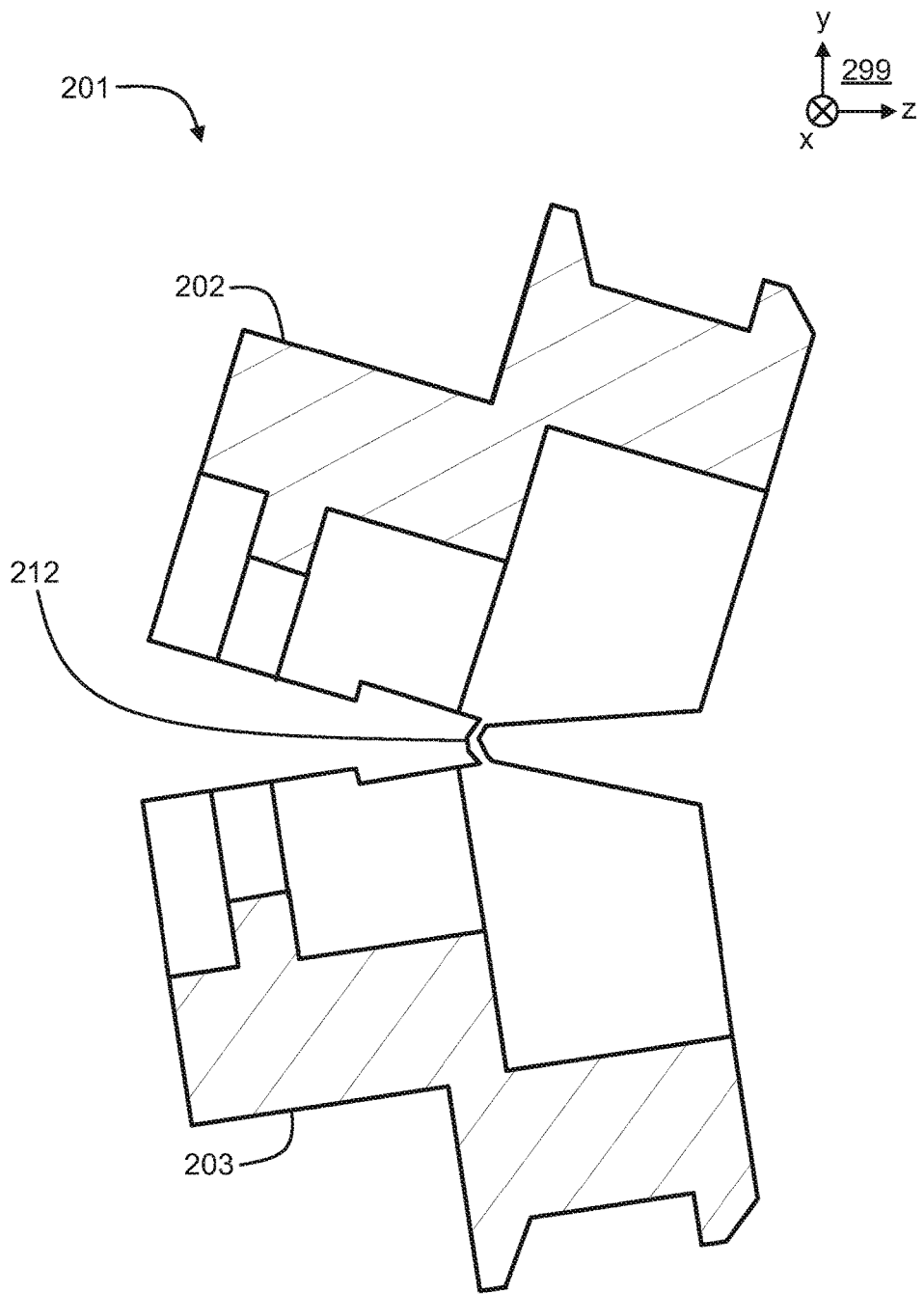
FIG. 2 illustrates a cable clamp according to an exemplifying and non-limiting embodiment of the invention.

In the exemplifying case illustrated in FIGS. 1a-1e, the first and second elements 102 and 103 of the cable clamp 101 are separate pieces of material. FIG. 2 shows cable clamp 201 according to another exemplifying and non-limiting embodiment of the invention. The cable clamp 201 comprises a bendable isthmus 212 between first and second elements 202 and 203 of the cable clamp. The bendable isthmus allows the first and second elements to be turned with respect to each other between mutual positions such as illustrated in FIGS. 1d and 1e.

Figure 3A:
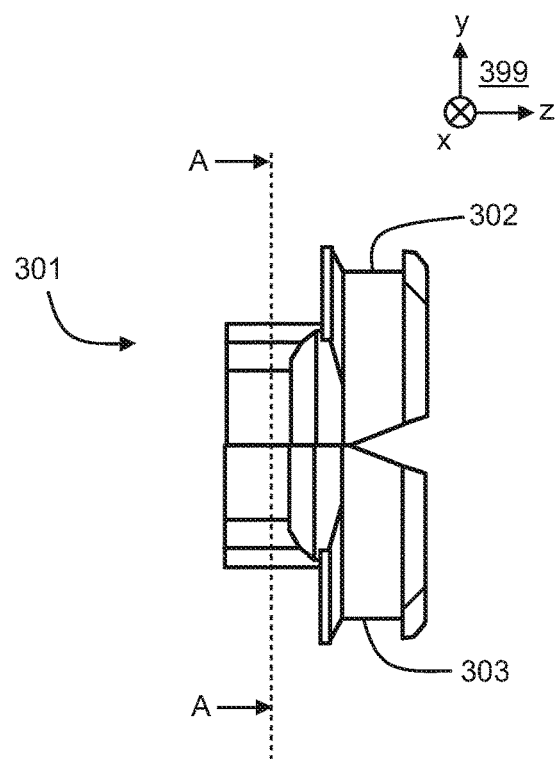
FIGS. 3a and 3b illustrate a cable clamp according to an exemplifying and non-limiting embodiment of the invention.
Figure 3B:
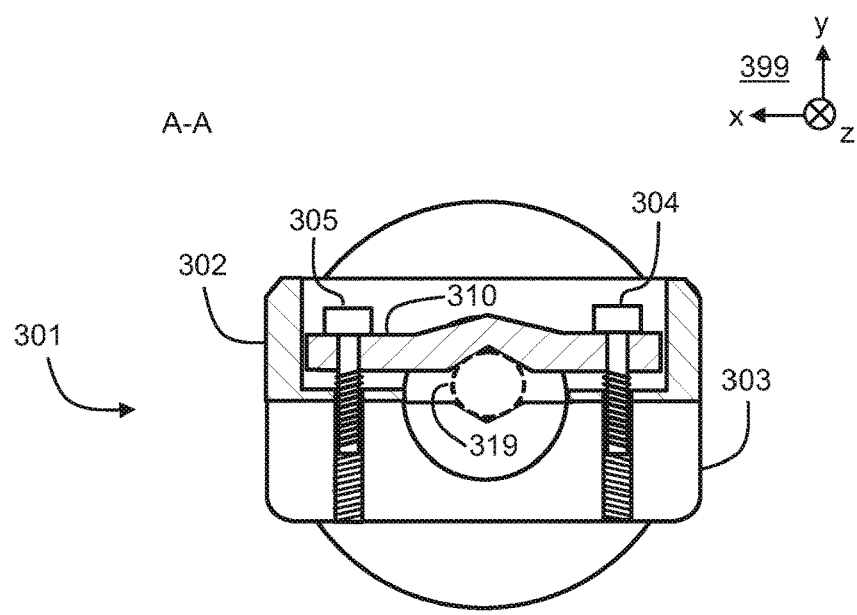

FIG. 3a shows a side view of a cable clamp 301 according to an exemplifying and non-limiting embodiment of the invention. FIG. 3b shows a view of a section taken along a line A-A shown in FIG. 3a. The section plane is parallel with the xy-plane of a coordinate system 399. The cable clamp 301 comprises a first element 302, a second element 303, and retainer devices 304 and 305. In the exemplifying cable clamp 301 illustrated in FIGS. 3a and 3b, the first element 302 comprises a clamping part 310 that is a separate piece with respect to a body of the first element 302. The retainer devices 304 and 305 are arranged to press the clamping part 310 towards the second element 303 so as to press a cable between the clamping part 310 and the second element 303 as illustrated in FIG. 3b. The outer surface of the cable being clamped is depicted with a dashed line circle 319 in FIG. 3b. In the exemplifying case illustrated in FIGS. 3a and 3b, the retainer devises 304 and 305 are screws arranged to fit with threaded holes of the second element 303.

Figure 4A:
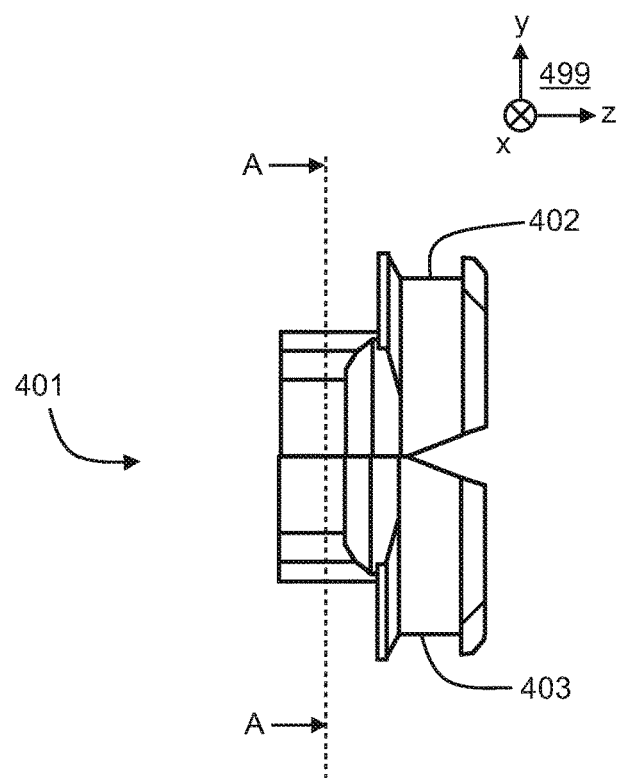
FIGS. 4a and 4b illustrate a cable clamp according to an exemplifying and non-limiting embodiment of the invention.
Figure 4B:
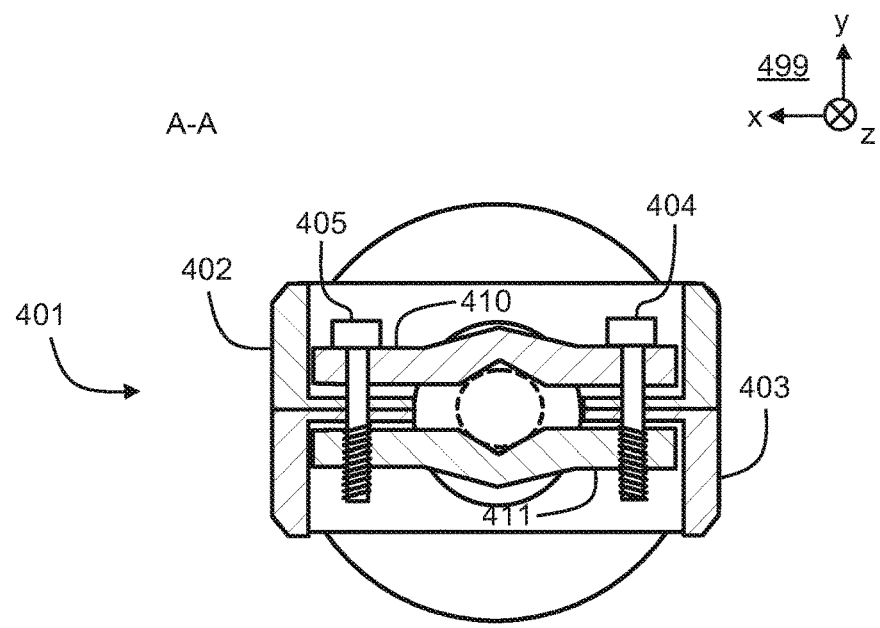

FIG. 4a shows a side view of a cable clamp 401 according to an exemplifying and non-limiting embodiment of the invention. FIG. 4b shows a view of a section taken along a line A-A shown in FIG. 4a. The section plane is parallel with the xy-plane of a coordinate system 499. The cable clamp 401 comprises a first element 402, a second element 403, and retainer devices 404 and 405. In the exemplifying cable clamp 401 illustrated in FIGS. 4a and 4b, the first element 402 comprises a first clamping part 410 that is a separate piece with respect to a body of the first element 402 and the second element 403 comprises a second clamping part 411 that is a separate piece with respect to a body of the second element 403. The retainer devices 404 and 405 are arranged to press the first and second clamping parts 410 and 411 towards each other so as to press a cable between the first and second clamping parts 410 and 411 as illustrated in FIG. 4b. The outer surface of the cable being clamped is depicted with a dashed line circle in FIG. 4b. In the exemplifying case illustrated in FIGS. 4a and 4b, the retainer devises 404 and 405 are screws arranged to fit with threaded holes of the second clamping part 411.

Figure 5A:
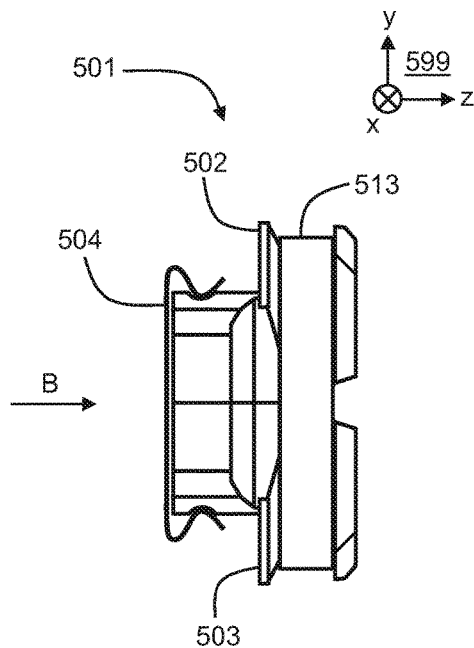
FIGS. 5a, 5b, and 5c illustrate a cable clamp according to an exemplifying and non-limiting embodiment of the invention.
Figure 5B:
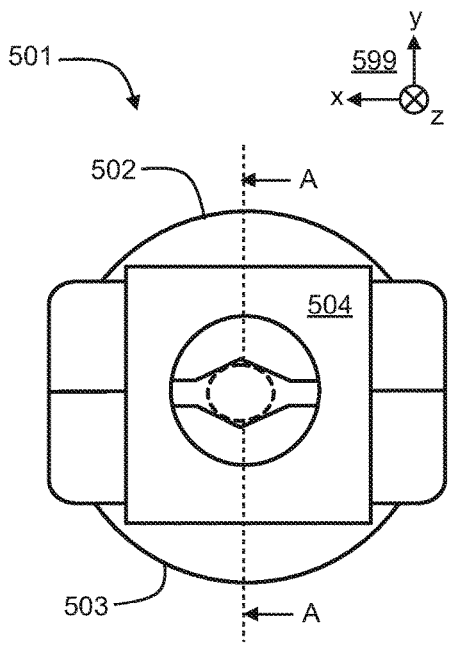
Figure 5C:
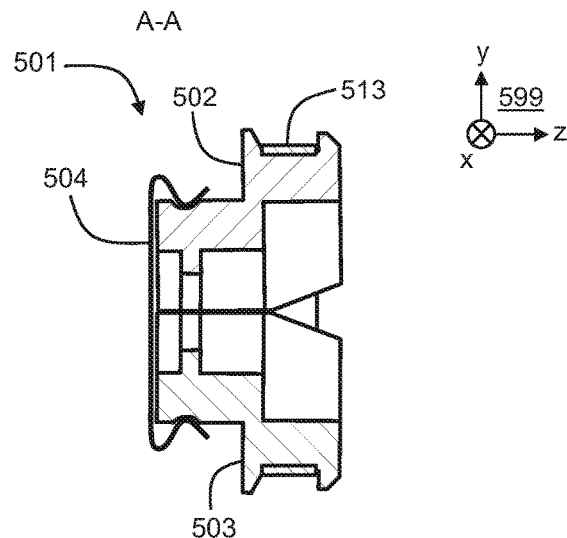

FIG. 5a shows a side view of a cable clamp 501 according to an exemplifying and non-limiting embodiment of the invention. FIG. 5b shows a view of the cable clamp 501 seen along an arrow B shown in FIG. 5a. FIG. 5c shows a view of a section taken along a line A-A shown in FIG. 5b. The section plane is parallel with the yz-plane of a coordinate system 599. The cable clamp 501 comprises a first element 502, a second element 503, and a retainer device 504 for keeping the first and second elements together as illustrated in FIGS. 5a-5c. In this exemplifying case, the retainer device 504 is a clip spring arranged to keep the first and second elements 502 and 503 in the mutual position illustrated in FIGS. 5a-5c. The clip spring 504 can be made of a sheet of suitable spring material such as for example steel. It is also possible that there is two or more clip springs for keeping the first and second elements 502 and 503 in the mutual position illustrated in FIGS. 5a-5c. The outer surface of a cable being clamped is depicted with a dashed line circle in FIG. 5b.

The exemplifying cable clamp illustrated in FIGS. 5a-5c further comprises flexible material 513 on the surface that is intended to face towards the wall surface of a through hole into which the cable clamp can be installed. The flexible material can be e.g. rubber or some other suitable flexible material, and a layer of the flexible material can be attached to the appropriate surfaces of the first and second elements 502 and 503. The exemplifying cable clamp illustrated in FIGS. 5a-5c comprises a flexible band made of the flexible material 513 and surrounding the surface intended to face towards the wall surface of a through hole.

In the above-described exemplifying cable clamps 101, 201, 301, 401, and 501, the first and second elements 102, 103, 202, 203, 302, 303, 402, 403, 502, and 503 can be made of for example plastic or metal. The method of manufacture may comprise for example mold casting and/or machining.

Figure 6:
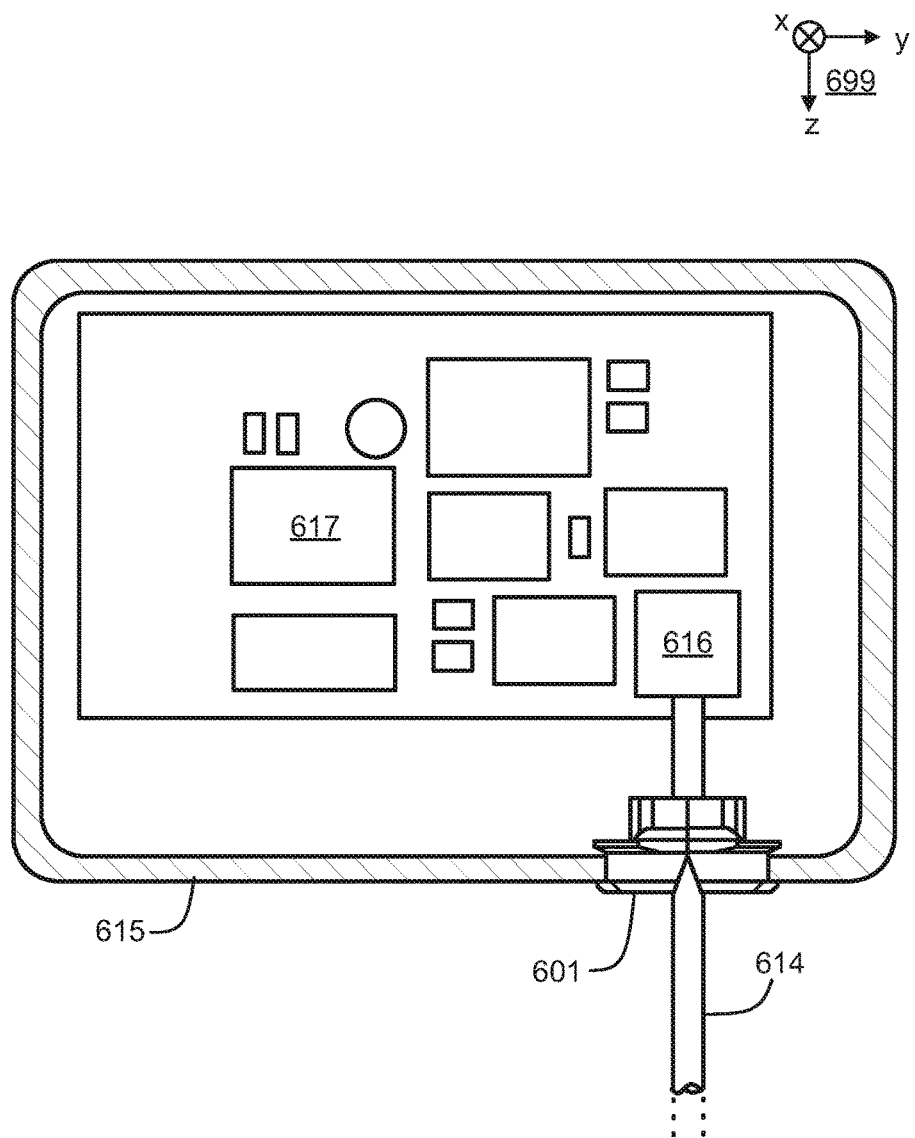
FIG. 6 illustrates an electrical device according to an exemplifying and non-limiting embodiment of the invention.

FIG. 6 illustrates an electrical device according to an exemplifying and non-limiting embodiment of the invention. The electrical device can be, for example but not necessarily, a part of telecommunication equipment and the electrical device may comprise, for example, a processing system for supporting at least one of the following data transfer protocols: Internet Protocol "IP", Ethernet protocol, MultiProtocol Label Switching "MPLS" protocol, and/or Asynchronous Transfer Mode "ATM". The electrical device comprises a casing 615. In FIG. 6, a section view of the casing 615 is shown. The section is taken along a plane parallel with the yz-plane of a coordinate system 699. The electrical device comprises one or more electrical components inside the casing. Two of the electrical components are denoted with reference numbers 617 and 616. The electrical device comprises a cable 614 connected to the electrical component 616 and a cable clamp 601 for clamping the cable 614 with respect to the edges of a through hole of the casing 615. The cable clamp 601 can be, for example, such as any of the cable clamps illustrated earlier in this document. The cable 616 can be, for example, an electrical cable or an optical cable.

The specific examples provided in the description given above should not be construed as limiting the applicability and/or the interpretation of the appended claims.

What is claimed is:

1. A cable clamp for clamping a cable with respect to edges of a through hole of a solid object, the cable clamp comprising:
    a first element;
    a second element; and
    one or more retainer devices configured to keep the first and second elements with respect to each other so that the first and second elements are in a first mutual position,
    wherein
        a) in response to being in the first mutual position, the first and second elements are locked to the edges of the through hole with the aid of first claws extending over the edges of the through hole on a first side of the solid object and with the aid of second claws extending over the edges of the through hole on a second side of the solid object, and the cable is clamped between the first and second elements, and
        b) in response to being in a second mutual position in which the first and second elements are tilted with respect to each other so that the first claws are nearer to each other than in the first mutual position, the first and second elements are configured to be inserted to the through hole,
    wherein a direction in which the first claws are nearer to each other in the second mutual position than in the first mutual position is substantially non-intersecting with directions in which the first claws are configured to extend over the edges of the through hole on the first side of the solid object when the first and second elements are in the first mutual position, and
    wherein the first element comprises a clamping part that is a separate piece of material with respect to a body of the first element, and when the one or more retainer devices press the clamping part towards the second element, the clamping part presses the cable against the second element.

2. The cable clamp according to claim 1, wherein the clamping part of the first element is a first clamping part and the second element comprises a second clamping part that is a separate piece with respect to a body of the second element, and
    the one or more retainer devices press the first and second clamping parts towards each other to press the cable between the first and second clamping parts.

3. The cable clamp according to claim 2, wherein the retainer devices are screws configured to fit with threaded holes of the second element.

4. The cable clamp according to claim 2, wherein the one or more retainer devices are one or more clip springs configured to keep the first and second elements in the first mutual position.

5. The cable clamp according to claim 2, wherein the first and second elements are separate pieces of material.

6. The cable clamp according to claim 2, wherein the cable clamp comprises a bendable isthmus between the first and second elements that allows the first and second elements to be turned with respect to each other between the first and second mutual positions.

7. The cable clamp according to claim 1, wherein the retainer devices are screws configured to fit with threaded holes of the second element.

8. The cable clamp according to claim 1, wherein the one or more retainer devices are one or more clip springs configured to keep the first and second elements in the first mutual position.

9. The cable clamp according to claim 1, wherein the first and second elements are separate pieces of material.

10. The cable clamp according to claim 1, wherein the cable clamp comprises a bendable isthmus between the first and second elements that allows the first and second elements to be turned with respect to each other between the first and second mutual positions.

11. The cable clamp according to claim 1, wherein the first and second elements are made of one of the following: plastic and metal.

12. The cable clamp according to claim 1, further comprising flexible material on a surface facing towards a wall surface of the through hole of the solid object.

13. The cable clamp according to claim 12, further comprising a flexible band made of the flexible material and surrounding the surface facing towards the wall surface of the through hole of the solid object.

14. An electrical device comprising:
    a cable;
    a casing having a through hole for the cable;
    one or more electrical components inside the casing and connected to the cable; and
    a cable clamp for clamping the cable with respect to edges of the through hole of the casing, the cable clamp comprising:
        a first element,
        a second element, and
        one or more retainer devices configured to keep the first and second elements with respect to each other so that the first and second elements are in a first mutual position,
        wherein
            a) in response to being in the first mutual position, the first and second elements are configured to be locked to the edges of the through hole with the aid of first claws configured to extend over the edges of the through hole on a first side of the solid object and with the aid of second claws configured to extend over the edges of the through hole on a second side of the solid object, and the cable is configured to be clamped between the first and second elements, and b) in response to being in a second mutual position in which the first and second elements are tilted with respect to each other so that the first claws are nearer to each other than in the first mutual position, the first and second elements are configured to be inserted to the through hole, wherein a direction in which the first claws are nearer to each other in the second mutual position than in the first mutual position is substantially non-intersecting with directions in which the first claws are configured to extend over the edges of the through hole on the first side of the solid object when the first and second elements are in the first mutual position, and wherein the first element comprises a clamping part that is a separate piece of material with respect to a body of the first element, and when the one or more retainer devices press the clamping part towards the second element, the clamping part presses the cable against and the second element.

15. The electrical device according claim 14, wherein the one or more electrical components comprise a processing system configured to support at least one of the following data transfer protocols: Internet Protocol (IP), Ethernet protocol, MultiProtocol Label Switching (MPLS) protocol, and Asynchronous Transfer Mode (ATM).

\* \* \* \* \*